(12) United States Patent
Kitagawa et al.

(10) Patent No.: US 9,740,195 B2
(45) Date of Patent: Aug. 22, 2017

(54) STORAGE CELL SYSTEM AND POWER PLANT CONTROL SYSTEM

(71) Applicant: Hitachi, Ltd., Chiyoda-ku, Tokyo (JP)

(72) Inventors: Katsuhide Kitagawa, Tokyo (JP); Kazuyasu Asakura, Tokyo (JP); Tohru Akatsu, Tokyo (JP); Hiroto Takeuchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 236 days.

(21) Appl. No.: 14/434,134

(22) PCT Filed: Sep. 20, 2013

(86) PCT No.: PCT/JP2013/075405
§ 371 (c)(1),
(2) Date: Apr. 8, 2015

(87) PCT Pub. No.: WO2014/057788
PCT Pub. Date: Apr. 17, 2014

(65) Prior Publication Data
US 2015/0277437 A1 Oct. 1, 2015

(30) Foreign Application Priority Data
Oct. 10, 2012 (JP) .................................. 2012-225546

(51) Int. Cl.
G05D 3/12 (2006.01)
G05B 19/414 (2006.01)
(Continued)

(52) U.S. Cl.
CPC ......... *G05B 19/414* (2013.01); *G06F 1/3203* (2013.01); *G06Q 10/0631* (2013.01);
(Continued)

(58) Field of Classification Search
CPC ............ G05B 19/04; G05B 2219/2614; G05B 19/414; G05B 2219/32021;
(Continued)

(56) References Cited

U.S. PATENT DOCUMENTS

2008/0211230 A1* 9/2008 Gurin .................. B60L 11/1861
290/2
2012/0228935 A1* 9/2012 Nakashima ............... H02J 3/32
307/24

(Continued)

FOREIGN PATENT DOCUMENTS

CN 102182634 A 9/2011
CN 102522814 A 6/2012
(Continued)

OTHER PUBLICATIONS

International Search Report (PCT/ISA/210) dated Oct. 15, 2013 with English-language translation (Four (4) pages).

(Continued)

*Primary Examiner* — Robert Fennema
*Assistant Examiner* — Thomas Stevens
(74) *Attorney, Agent, or Firm* — Crowell & Moring LLP

(57) ABSTRACT

To further optimize an operation of a power plant. The system has a storage cell which charges utilizing surplus electric power generated by a power plant 10 and a database 23 which accumulates at least information on power consumption for each power plant apparatus 11 (hereinafter, described as an in-plant apparatus). An integrated controller 225 compares power consumption of the power plant apparatus 11 in operation in the case of executing each function among a plurality of functions and an electric discharge capacity of the storage cell, and selects an executable function within a range of the electric discharge capacity of the storage cell. Then, it controls to execute the selected (Continued)

function utilizing electric power supplied from the storage cell.

7 Claims, 10 Drawing Sheets

(51) Int. Cl.
| | |
|---|---|
| *G06Q 50/06* | (2012.01) |
| *H02J 3/32* | (2006.01) |
| *G06Q 10/06* | (2012.01) |
| *H02J 7/34* | (2006.01) |
| *G06F 1/32* | (2006.01) |
| *H02J 9/06* | (2006.01) |

(52) U.S. Cl.
CPC ............... *G06Q 50/06* (2013.01); *H02J 3/32* (2013.01); *H02J 7/34* (2013.01); *G05B 2219/32021* (2013.01); *H02J 9/06* (2013.01); *Y02E 40/76* (2013.01); *Y04S 10/545* (2013.01)

(58) Field of Classification Search
CPC ........... G05D 23/1932; G05D 23/1917; G05D 23/193; F24F 11/0001; H05K 7/20745; G06F 1/3203; H02J 7/34; H02J 3/32; H02J 9/06; G06Q 10/0631; G06Q 50/06; Y04S 10/545; Y02E 40/76

USPC .......................................... 700/291, 295–298
See application file for complete search history.

(56) References Cited

U.S. PATENT DOCUMENTS

| | | | | |
|---|---|---|---|---|
| 2012/0239214 | A1* | 9/2012 | Nakashima ............... | H02J 3/32 |
| | | | | 700/291 |
| 2015/0280435 | A1* | 10/2015 | Metcalfe ................ | G06Q 50/06 |
| | | | | 700/295 |
| 2016/0172859 | A1* | 6/2016 | Marhoefer ................ | H02J 3/32 |
| | | | | 700/295 |

FOREIGN PATENT DOCUMENTS

| | | |
|---|---|---|
| JP | 4-285880 A | 10/1992 |
| JP | 2003-32890 A | 1/2003 |
| JP | 2003-153448 A | 5/2003 |
| JP | 2005-328622 A | 11/2005 |
| JP | 2010-148336 A | 7/2010 |

OTHER PUBLICATIONS

Chinese-language Office Action issued in counterpart Chinese Application No. 201380050141.8 dated Aug. 22, 2016 with English translation (18 pages).

\* cited by examiner

REDUCTION BY ONE STEP

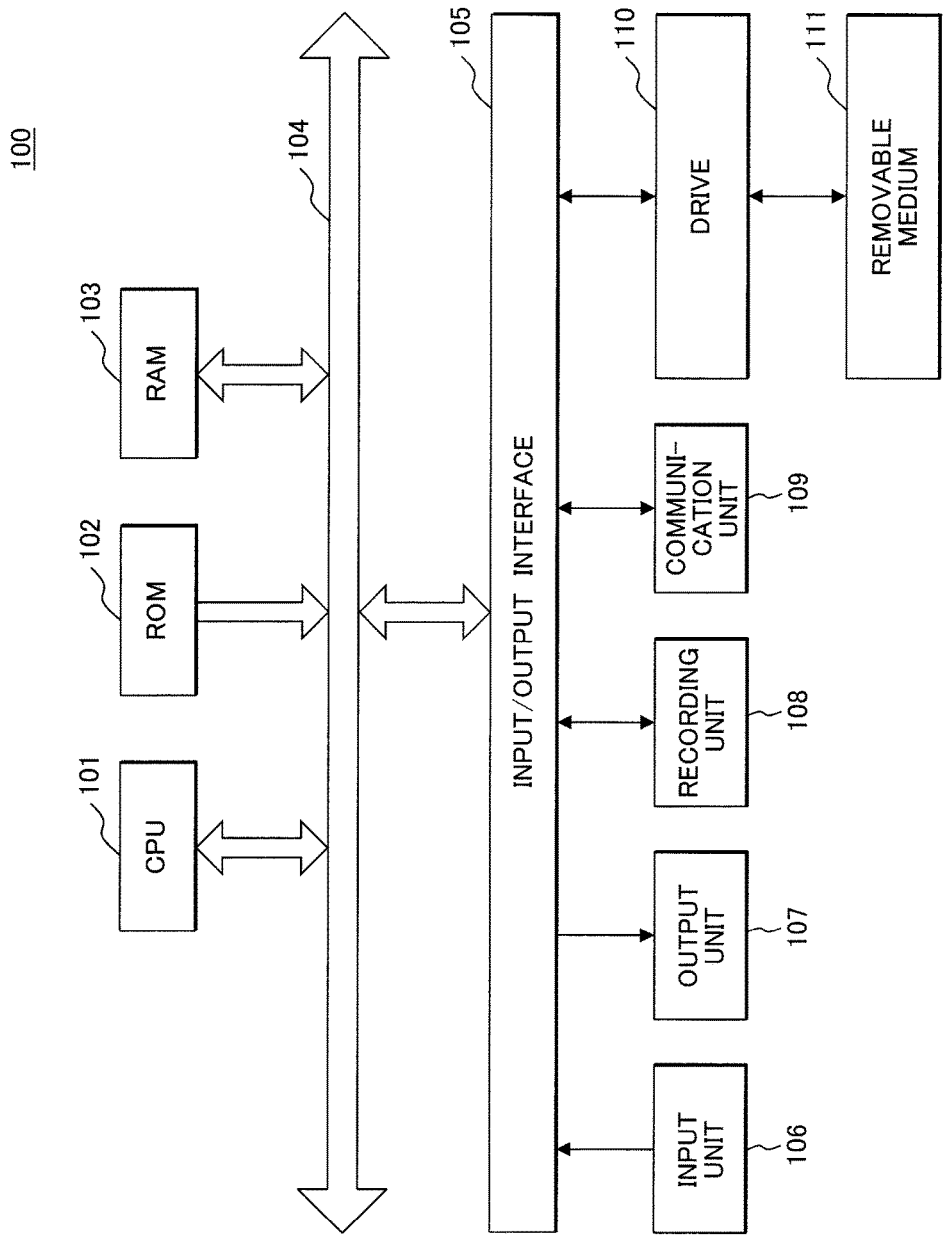

STORAGE CELL SYSTEM AND POWER PLANT CONTROL SYSTEM

TECHNICAL FIELD

The present invention relates to a storage cell system and a power plant control system, and relates to a technology of operational optimization of a power plant, for example, a power plant for business use, etc.

BACKGROUND ART

Conventionally, regarding optimal operations of power plants, there are known: a technology related to optimal control parameter tuning that corresponds to the operation state and combustion efficiency of the power plant, and a technology of improving power generation efficiency by a combination of power generation systems, etc.

At present, applications of the storage cell system to a power plant are almost occupied by utilizations as emergency backup power sources for important facilities and control devices in the power plant. However, in recent years, due to a technological progress of the storage cell (prolonged life, increased capacity, decreased cost, etc.), utilization methods other than usages as emergency power supplies are being expected.

For example, Patent Document 1 discloses a power generation system in which a dynamo for supplying electric power to a load apparatus connected thereto is provided together with a commercial alternating current line, the dynamo is set to perform continuous operation with a constant output, and a storage cell for storing the output power of the dynamo is provided.

This power generation system is configured to charge surplus output power of the dynamo that is not consumed by the load apparatus in the storage cell and to, when the power consumption of the load apparatus exceeds the output power of the dynamo, supply electric power of the storage cell to the load apparatus.

CITATION LIST

Patent Document

Patent Document 1: Japanese Unexamined Patent Application Laid-Open No. 2003-153448

SUMMARY OF THE INVENTION

Technical Problem

Incidentally, with environmental problems and electric power shortage as a background, a need of operational optimization to power plants in its whole life cycle is large with respect to not only measures for energy saving on the electric power customers' side but also further efficient power generation and improvement in lives of facilities on suppliers' side.

Conventionally, there has been a movement of trying to achieve operational optimization of the power plant by efficiently controlling power plant apparatuses themselves such as power generation facilities and apparatuses installed in the power plant. However, there was a limit in optimal control and operation of the power plant apparatuses due to a performance limit caused by characteristics of the power plant apparatuses and a fact that cost-effectiveness is not satisfied.

From the above situation, further operational optimization of the power plant has been demanded.

Means for Solving the Problem

The present inventors propose a method for optimizing the operation of the power plant by storing surplus electric power generated by the power plant and utilizing the stored electric power effectively.

One profile of the present invention lies in that a system has the storage cell for performing charging using the surplus electric power generated by the power plant and a database in which at least information on power consumption of each power plant apparatus (hereinafter, described as an in-plant apparatus) is accumulated. Then, the integrated controller compares power consumption of the power plant apparatus in operation in the case of executing each function among a plurality of functions and a dischargeable electric quantity of the storage cell, and selects a function that can be executed within a range of the dischargeable electric quantity of the storage cell. Then, it controls so that the selected function may be executed utilizing electric power supplied from the storage cell.

Advantageous Effects of the Invention

According to at least one embodiment of the present invention, by a combination of the power plant and a storage cell system, an effective and efficient operation of the power plant is realized.

BRIEF DESCRIPTION OF DRAWINGS

FIG. 10 is a block diagram showing a configuration example of hardware of a computer.

DESCRIPTION OF THE EMBODIMENTS

Figure 1:
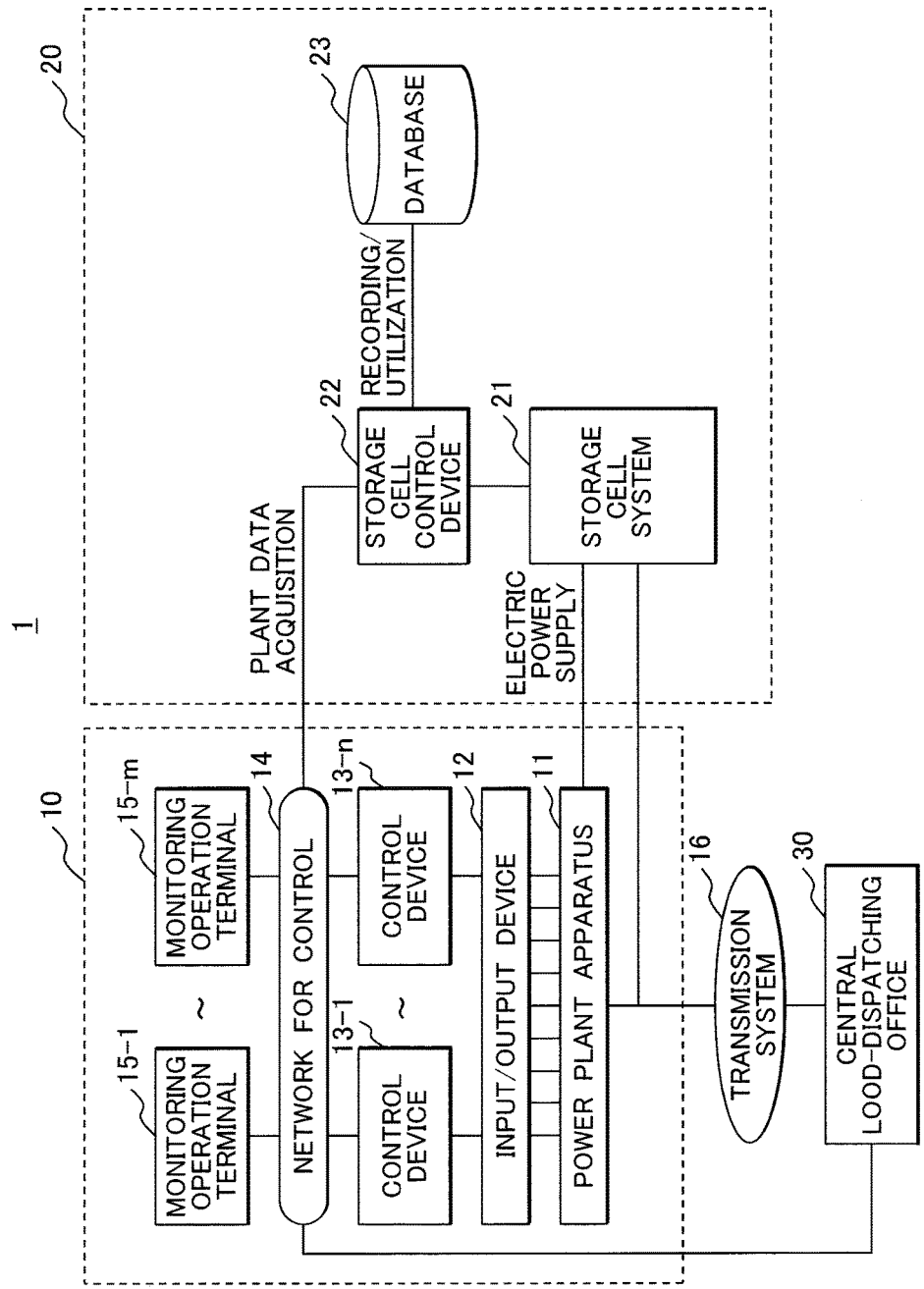
FIG. 1 is a schematic diagram showing an example of an overall configuration of a power plant control system according to one embodiment of the present invention.

Hereinafter, examples of modes for carrying out the present invention will be described referring to attached drawings. Incidentally, in each drawing, a common component is attached the same reference numeral and a repeated explanation is omitted.

In this embodiment, a storage cell system that includes a storage cell and its storage cell control device is applied and the storage cell control device and the power plant are connected with a network. Then, while the storage cell control device collects operation data, etc. of the power plant, it controls charging/discharging of the storage cell optimally, based on the data. Below, an example where the storage cell control device implements the following three functions will be explained, but the functions to be implemented are not limited to this example.

(1) In-plant power reducing function
(2) In-plant apparatus starting time shortening function
(3) Constant load operation support function The storage cell control device performs integrated control of these functions (1) to (3) appropriately. Details of each function will be described later.

[Example of Overall Configuration of Power Plant Control System]

FIG. 1 is a schematic diagram showing an example of an overall configuration of a power plant control system according to one embodiment of the present invention. A power plant control system 1 according to this embodiment is configured by combining a conventional power plant 10 and a storage cell system 20 according to one embodiment of the present invention.

The power plant 10 is configured with, for example, a power plant apparatus 11, an input/output device 12, control units 13-1 to 13-n (n: natural number), a network for control 14, and monitoring operation terminals 15-1 to 15-m (m: natural number). The power plant 10 is connected with a central load-dispatching office 30 via a transmission system 16 for sending the generated electric power to a customer side.

The power plant apparatus 11 includes main machinery (a boiler, a turbine, a dynamo), auxiliary machinery (mechanical apparatuses that serve power generation except for that of the main machinery), and other power generation facilities and meters.

The input/output device 12 is arranged between the power plant apparatus 11 and the control units 13-1 to 13-n, and inputs and outputs a signal and data to/from the both. The input/output device 12 is solely provided as an interface panel, or its function is incorporated in the control units 13-1 to 13-n.

The control units 13-1 to 13-n control the power plant apparatuses 11, especially, the main machinery of the boiler, the turbine, and the dynamo. The control units 13-1 to 13-n include, for example, an APC (Automatic Power Plant Control) that manipulates various kinds of adjustable valves of the boiler, a main turbine drive control device (EHG), an AVR (Automatic Voltage Regulator) used for voltage control of the dynamo, etc. In addition, there are an electric protection interlock panel, a sequencer panel, etc.

The monitoring operation terminals 15-1 to 15-m are so-called HMIs (Human Machine Interfaces). The monitoring operation terminal 15 is configured of a display device for displaying a power plant state such as a liquid crystal panel and a computer device that generates a display screen from information on operating statuses of the power plant apparatuses received from the network for control 14 and outputs it on the display device. Moreover, the monitoring operation terminal 15 has an input operation unit, and as the input operation unit, a touch panel that is formed integrally with the liquid crystal panel, a keyboard, a mouse, or the like is used.

The network for control 14 is a communication network for control that connects the power plant apparatus 11, the monitoring operation terminals 15-1 to 15-m, etc. in the power plant 10 so that they can communicate with one another. In FIG. 1, the control units 13-1 to 13-n and the monitoring operation terminals 15-1 to 15-m are connected. Moreover, the network for control 14 is connected with a storage cell control device 22 of the storage cell system 20. Although this network for control 14 is an in-plant network that generally uses a dedicated protocol, protocol conversion through a gateway makes it possible to communicate with the outside such as the central load-dispatching office 30, for example, using an IP protocol.

[Configuration Example of Storage Cell System]

Next, the storage cell system 20 will be explained.

As shown in FIG. 1, the storage cell system 20 has a storage cell facility 21, the storage cell control device 22, and a database 23.

The storage cell control device 22 collects data about the power plant 10 such as the operating statuses of the power plant apparatuses 11 from the network for control 14. The storage cell control device 22 controls charging/discharging of the storage cell facility 21 based on the collected data about the power plant 10. Moreover, the storage cell control device 22 performs management of the database 23, records the data, and utilizes it. Incidentally, although the storage cell control device 22 receives data about an optimal operation of the power plant 10 from the network for control 14, it may be configured to receive the data from an information system network (illustration abbreviated) such as the Internet, etc.

The storage cell facility 21 includes necessary facilities such as the storage cell, a power conditioner (PCS: Power Conditioning Subsystem), and a converter, and charges the storage cell with surplus electric power outputted by the power plant 10 through the in-plant system under control of the storage cell control device 22. Moreover, the storage cell facility 21 supplies electric power of the storage cell to the power plant apparatus 11 of the power plant 10 additionally.

The database is nonvolatile storage means. Data, rating information, setting information, etc. that the storage cell control device 22 obtained from the power plant 10 are stored in the database 23 if needed.

By executing each function of the storage cell control device 22 explained in the following, the storage cell control device 22 performs charging/discharging control of the storage cell, etc., and carries out optimal electric power supply from the storage cell to the power plant 10.

The storage cell facility 21 described above can be configured using, for example, the storage cell and the power conditioner (the PCS). The PCS is controlled optimally by the storage cell control device 22.

Generally, the PCS is a facility that has a function to convert power generation electric power such as of a solar cell, a fuel cell, a gas engine, etc. into system electric power, and has the following functions.

Control of power generation electric power (output power is controlled according to an amount of power generation such as of the solar cell, the fuel cell, the gas engine, etc.)

Operation control (operation is started/suspended according to power generation situation)

System interconnection protection function (abnormalities of system are detected and operation is suspended)

Moreover, the storage cell control device 22 is connected to the network for control 14 of the power plant 10, and carries out optimal control of the storage cell via the PCS in conjunction with the control units 13-1 to 13-n of the conventional power plant 10.

The storage cell control device 22 aims to acquire control data and operation data of the power plant 10 and to schedule optimal timing of the charging/discharging of the storage cell based on the operation status of the power plant apparatus 11 and operation messages corresponding to demand-and-supply from the central load-dispatching office 30. Moreover, it aims to carry out control to extend lives of the storage cell and the power plant apparatuses 11 and to perform control according to the operation of the power plant 10 and information cooperation.

Figure 2:
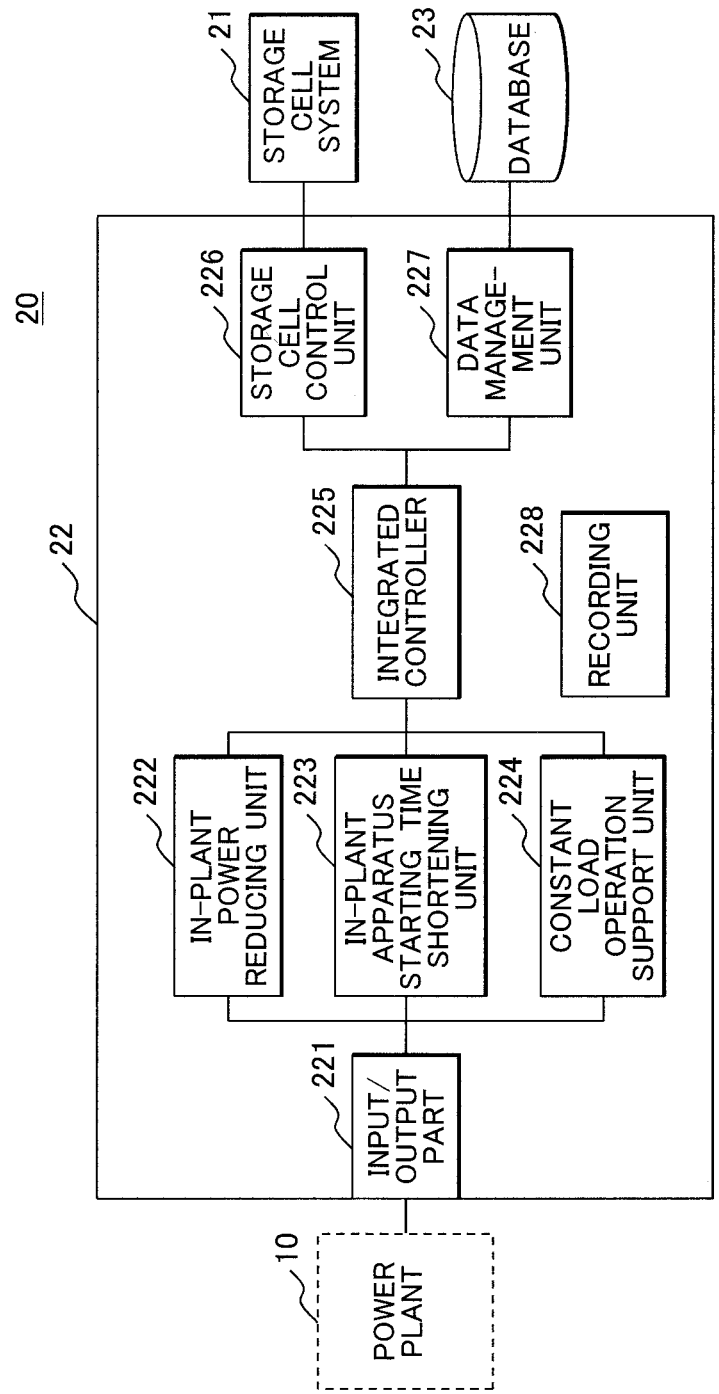
FIG. 2 is a block diagram showing an example of an internal configuration of a storage cell control device.

FIG. 2 is a block diagram showing an example of an internal configuration of the storage cell control device 22 of the storage cell system 20.

The storage cell control device 22 is configured with an input/output unit 221, an in-plant power reducing unit 222, an in-plant apparatus starting time shortening unit 223, a constant load operation support unit 224, an integrated controller 225, a storage cell control unit 226, a data management unit 227, and a recording unit 228. The in-plant power reducing unit 222, the in-plant apparatus starting time shortening unit 223, the constant load operation support unit 224, the integrated controller 225, and the storage cell control unit 226 that are described above show the functions (blocks) that a processor executes.

The input/output unit 221 is one example of a communication interface unit, and performs transmission/reception of the data with the power plant 10 through the unillustrated communication interface of the power plant 10. The input/output unit 221 outputs the data that is received from the power plant 10 and includes the operating statuses, etc. of the power plant apparatuses 11 to the in-plant power reducing unit 222, the in-plant apparatus starting time shortening unit 223, and the constant load operation support unit 224.

(In-Plant Power Reducing Part)

The in-plant power reducing unit 222 executes the in-plant power reducing function of reducing electric power required to drive the auxiliary machinery for power generation of the power plant 10.

The in-plant power is electric power required to drive the auxiliary machinery for power generation and the like (mechanical devices that serve power generation, other than the boiler, the turbine, and dynamo), and normally the in-plant power is provided by electric power that is generated by the power plant 10. Conventionally, this in-plant power is provided by the output of the dynamo, but since a total amount of power generation of the power plant 10 has a limit, regarding electric power that is actually transmitted to the transmission system 16, only electric power obtained by subtracting this in-plant power from that power could be supplied. Therefore, supplying electric power stably while reducing the in-plant power has become a problem. Conventionally, the following methods have been carried out: by introducing an inverter in the power plant and controlling the number of rotation of a motor, etc. effectively, power consumption of the auxiliary machinery is tried to be lowered; by acquiring the in-plant power from another system outside the power plant, it is made possible to perform stable supply of the electric power at the time of emergency; and the like.

In this embodiment, without the need of reconstruction of the conventional power generation facilities and the power plant 10 themselves, it is possible to implement reduction of the in-plant power easily in terms of facilities by adding the storage cell and the storage cell control device 22 to the conventional power plant 10.

As a control method of the storage cell for achieving this object, it is considered to perform charging that uses final load electric power when the load drops in a suspension stage of the power plant or to control the charging using the surplus electric power in the night. When the charging is performed, it is recommended to control the timing of the charging such that the life of the storage cell does not become short and the specification of the object storage cell among a plurality of storage cells in the storage cell facility 21 in consideration of the present charging status of the storage cell and the number of times of charging/discharging having done heretofore. The electric power charged in the storage cell is controlled so as to be supplied from the storage cell at the time of starting the facilities after plant periodical check or as individual electric power of the auxiliary machinery and the like. However, a decision as to how much in-plant power is to be supplied from the storage cell is made after consideration of the number of operations of the auxiliary machinery, a required amount of power consumption, demand-and-supply balance, a demand forecast, performance of the storage cell, etc. A processing example when the in-plant power reducing function is executed will be described later (refer to FIG. 3).

(In-Plant Apparatus Starting Time Shortening Unit)

Returning to the explanation of FIG. 2, the in-plant apparatus starting time shortening unit 223 executes the in-plant apparatus starting time shortening function of shortening starting times of the plurality of power plant apparatuses 11.

Figure 4:
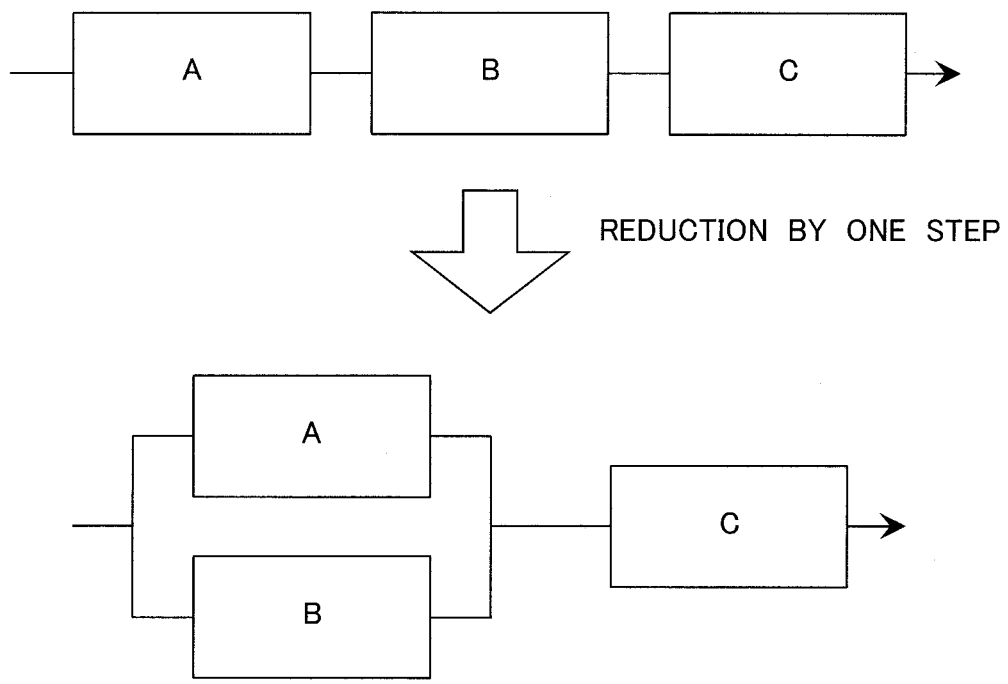
FIG. 4 is a diagram that is provided for an explanation of an in-plant apparatus starting time shortening function.

FIG. 4 is a diagram that is provided for an explanation of the in-plant apparatus starting time shortening function.

As shown in FIG. 4, when starting the power plant 10 or the in-plant power generation facilities, since there was a constraint of an amount of electric power that could be used in a fixed time, conventionally it was customary to start the power generation facilities (power plant apparatuses 11) sequentially (in this example, a sequence of the facilities A, B, and C). Therefore, it takes a considerable time to start the plant, and in case where the electric power supply to the transmission system 16 side is needed urgently, it is impossible to start the power plant 10 in a short time.

Then, by supplying the electric power for starting the power plant and for starting the facilities from the storage cell, it becomes possible to circumvent the above-mentioned constraint, which makes it possible to increase the power generation facilities that can be started simultaneously in number (in this example, the facility A and the facility B are started simultaneously). Accordingly, it becomes possible to shorten the starting time of the power plant 10 or the power generation facilities considerably. Also in this case, its implementation is made possible by scheduling starting of the facilities, such as which power generation facilities should be combined and started simultaneously, based on the amount of charging (electric discharge capacity) of the storage cell. A processing example when the in-plant apparatus starting time shortening function is executed will be described later (refer to FIG. 5).

(Constant Load Operation Support Unit)

Returning to the explanation of FIG. 2, the constant load operation support unit 224 executes the constant load operation support function of supporting a constant load operation of the power plant 10.

Figure 6:
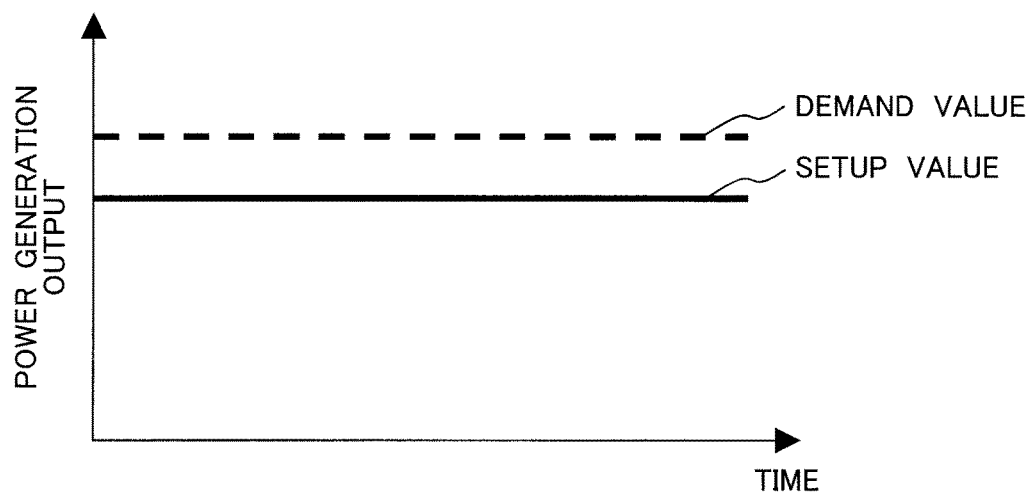
FIG. 6 is a diagram that is provided for an explanation of a constant load operation support function.

FIG. 6 is a diagram that is provided for an explanation of the constant load operation support function.

In power generation facilities including the turbine, it becomes possible to elongate lives of the power generation facilities more by carrying out an operation that sets a load (a setup value) constant than by carrying out a load variation operation that corresponds to a variation of electric power demand-and-supply balance (a demand value). However not limited to this, it is possible to improve power generation efficiency and to implement saving of fuel by an efficient operation.

Then, electric power (a difference) that is short due to the demand-and-supply balance is supplemented by the electric power stored in the storage cell so that a load of the power generation may become constant. A processing example when the constant load operation support function is executed will be described later (refer to FIG. 7).

(Integrated Controller)

The integrated controller 225 judges which functional group is optimal when being executed among the plurality of functions described above by prior simulation from a limited electric discharge capacity of the storage cell, and executes each function. For example, the integrated controller 225 selects an executable function within the range of the electric discharge capacity of the storage cell among the multiple functions by comparing the power consumption of the power plant apparatus 11 that operates when each function is executed and the electric discharge capacity of the storage cell. Then, it controls so that the selected function may be executed using the electric power supplied from the storage cell. However, the integrated controller 225 is not necessarily required in the carrying-out, and it is also possible to apply the individual functions of the in-plant power reducing unit 222, the in-plant apparatus starting time shortening unit 223, and the constant load operation support unit 224.

The storage cell control unit 226 controls the charging/discharging of the storage cell facility 21 under the control of integrated controller 225.

The data management unit 227 performs writing and reading of data in the database 23 and manages the database 23 under control of the integrated controller 225.

The recording unit 228 is a main storage device as one example, in which computer programs that respective function blocks execute are recorded. The recording unit 228 may be a nonvolatile recording unit.

[Example of Operation of In-Plant Power Reducing Unit]

Figure 3:
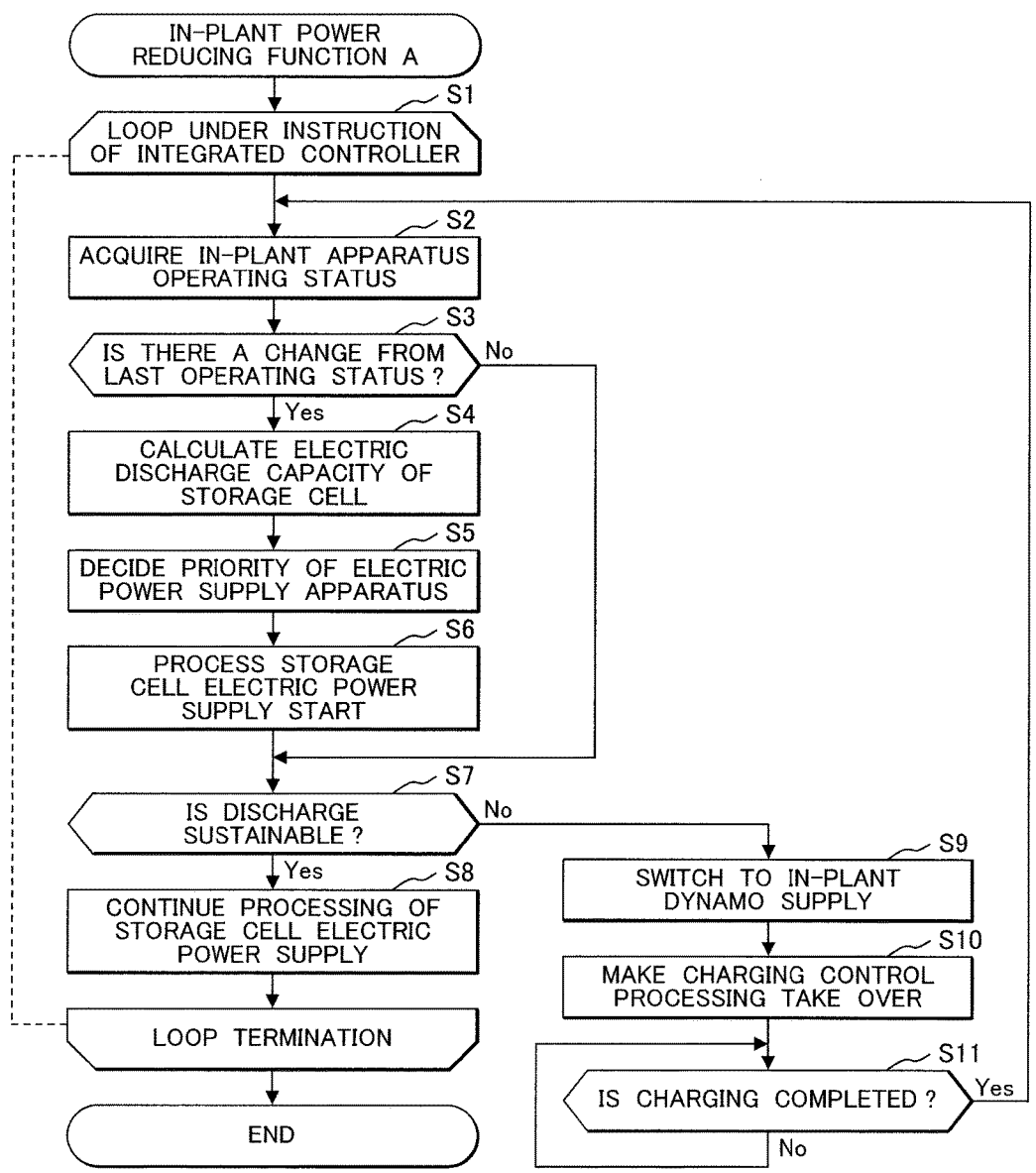
FIG. 3 is a flowchart showing an example of operation of an in-plant power reducing unit shown in FIG. 2.

FIG. 3 is a flowchart showing an example of operation of the in-plant power reducing unit 222 shown in FIG. 2.

The in-plant power reducing unit 222 performs loop processing of Steps S2 to S11 continuously while there are instructions from the integrated controller 225 (Step S1).

First, the in-plant power reducing unit 222 acquires information on the operating statuses of the power plant apparatuses 11 (in-plant apparatuses) via the network for control 14 (Step S2).

Next, the in-plant power reducing unit 222 determines whether there is a change in the operating statuses of the power plant apparatuses 11 in the last loop processing (Step S3). If there is the change, the process will proceed to Step S4; if there is no change, the process will proceed to Step S7.

Next, the in-plant power reducing unit 222 calculates the discharge capability (electric discharge capacity) of the storage cell through the storage cell control unit 226 (Step S4).

Next, the in-plant power reducing unit 222 reads the power consumption of each power plant apparatus 11 in operation from the database 23 through the data management unit 227. Then, it sets a priority of supply in the case of supplying electric power to the power plant apparatuses 11 in operation from the operating status of the power plant apparatus 11 (in-plant apparatus) and the power consumption of the power plant apparatus 11 (Step S5), Characteristics of the apparatuses such as the power consumption of each power plant apparatus 11 have been registered in advance in the database 23. Moreover, a default priority of supply may be registered in advance in the database 23.

Next, the in-plant power reducing unit 222 processes electric power supply start, from the storage cell to the power plant 10, in conjunction with the storage cell control unit 226 (Step S6).

Then, the in-plant power reducing unit 222 determines whether continuation of the electric power supply by the storage cell is possible based on the electric discharge capacity of the storage cell (Step S7). If the continuation of the electric power supply by the storage cell is possible, the electric power supply processing is continued (Step S8). When the processing of this Step S8 is ended, the loop is terminated and the process proceeds to Step S2.

On the other hand, if it is determined that the continuation of the electric power supply by the storage cell is impossible, the in-plant power reducing unit 222 will suspend supplying electric power from the storage cell, and will switch to processing where the electric power will be supplied from the dynamo of the power plant 10 (Step S9). Then, it shifts to charge control processing, where it charges the storage cell, for example, at midnight when an electric power cost is cheap, etc. (Step S10).

Next, the in-plant power reducing unit 222 waits until the charging of the storage cell is completed (Step S11), and shifts to processing of Step S2 after completion of the charging.

The in-plant power reducing unit 222 ends in-plant power reduction processing when any instruction of the integrated controller 225 ceases to exist.

Incidentally, although it is necessary to decide in advance an initial electric discharge capacity of the storage cell that is required in order to implement this function based on the in-plant power, etc., it may vary according to a scale of the power plant 10, etc. Moreover, when the electric discharge capacity of the storage cell is insufficient, the electric power is supplied not from an uppermost level of supply priority but, for example, from a supply destination of the second or later level. Alternatively, the electric power may be supplied in a disconnectedly skipped order of the supply priority.

As explained above, in this embodiment, the in-plant power reducing unit 222 acquires information on the operating statuses of the power plant apparatuses 11 from the power plant 10 after receiving an execution instruction of the integrated controller 225. Next, the in-plant power reducing unit 222 sets up the priority of supply in the case of supplying the electric power to the power plant apparatus 11 in operation from the storage cell based on the power consumption of each power plant apparatus 11 in operation, and controls so that the electric power may be supplied to the power plant apparatuses 11 from the storage cell within the range of the electric discharge capacity of the storage cell according to the supply priority.

By utilizing the storage cell and controlling so that power required for in-plant power may be supplied from the storage cell, it is possible to give a margin to the amount of electric power that can be transmitted, namely, it is possible not only to compensate the in-plant electric power, but also to increase a power generation output.

[Example of Operation of In-Plant Apparatus Starting Time Shortening Unit]

Figure 5:
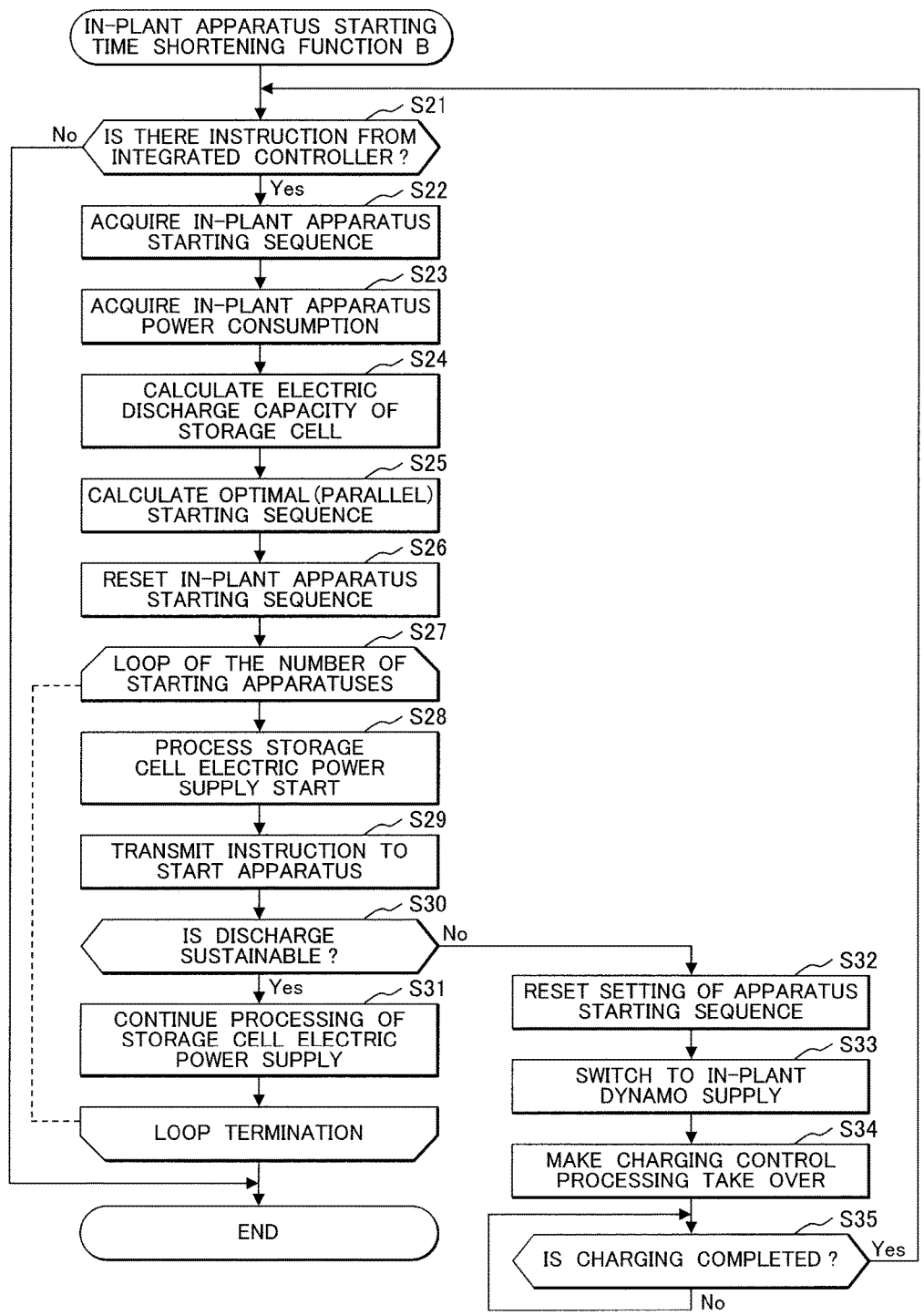
FIG. 5 is a flowchart showing an example of operation of an in-plant apparatus starting time shortening part shown in FIG. 2.

FIG. 5 is a flowchart showing an example of an operation of the in-plant apparatus starting time shortening unit 223 shown in FIG. 2.

First, the in-plant apparatus starting time shortening unit 223 determines whether there exists an instruction from the integrated controller 225 (Step S21), and when there is no instruction from the integrated controller 225, it ends in-plant apparatus starting time shortening processing.

Next, when there is an instruction from the integrated controller 225, the in-plant apparatus starting time shortening unit 223 reads in-plant apparatus starting sequence designed in advance from the database 23 (Step S22). Moreover, the in-plant apparatus starting time shortening unit 223 reads the power consumption of the power plant apparatus 11 contained in information on the in-plant apparatus starting sequence from the database 23 (Step S23).

Next, the in-plant apparatus starting time shortening unit 223 calculates the discharge capability (electric discharge capacity) of the storage cell through the storage cell control unit 226 (Step S24).

Next, the in-plant apparatus starting time shortening unit 223 calculates a parallel starting sequence in which units of the power plant apparatuses 11 are started in parallel based on the power consumption of the power plant apparatus 11 and the electric discharge capacity of the storage cell that are contained in the information on the in-plant apparatus starting sequence (Step S25).

Here, an optimal in-plant apparatus starting sequence is newly reset, while specifying the power plant apparatuses 11 that can be started in parallel and do not have a bad influence on the power plant 10 based on the original in-plant apparatus starting sequence and the power consumption of each power plant apparatus 11 (Step S26). For example, a combination of the power plant apparatuses that has the bad influence on the operation of the power plant when being started simultaneously is registered in advance in the database 23. Then, by approving combinations of the power plant apparatuses that do not correspond to this combination, the combination of the power plant apparatuses that can be started in parallel and do not have the bad influence to the power plant is specified.

Next, the in-plant apparatus starting time shortening unit 223 executes the following loop processing as many times as the number of the power plant apparatuses 11 that are included as startup objects (Step S27). First, the in-plant apparatus starting time shortening unit 223 processes the electric power supply start, from the storage cell to the power plant 10 (Step S28), in conjunction with the storage cell control unit 226 according to the in-plant apparatus starting sequence being reset.

Next, the in-plant apparatus starting time shortening unit 223 transmits a start command to the power plant apparatus 11 to be started (Step S29).

Then, the in-plant apparatus starting time shortening unit 223 determines whether the continuation of the electric power supply by the storage cell is possible based on the electric discharge capacity of the storage cell (Step S30). If the continuation of the electric power supply by the storage cell is possible, processing of the electric power supply will be continued (Step S31). When the processing of this Step S31 is ended, the loop is terminated and the flow proceeds to Step S28, where processing for the power plant 11 of the next priority is performed.

Here, if processing on the power plant apparatuses 11 is completed as many times as the number of startup objects, the in-plant apparatus starting time shortening processing will be ended.

On the other hand, if it is determined that the continuation of the electric power supply by the storage cell is impossible, the in-plant apparatus starting time shortening unit 223 will reset a setup of the in-plant apparatus starting sequence (Step S32). After that, the in-plant apparatus starting time shortening unit 223 suspends supplying the electric power from the storage cell, and switches to processing of supplying electric power from the dynamo of the power plant 10 (Step S33). Then, it shifts to charging control processing, and charges the storage cell (Step S34).

Next, the in-plant apparatus starting time shortening unit 223 waits until the charging of the storage cell is completed (Step S35), and shifts to processing of Step S21 after the completion of the charging.

Incidentally, although it is necessary to decide in advance the initial electric discharge capacity of the storage cell that is required in order to implement this function based on the in-plant power, etc., it may vary depending on the scale of the power plant 10, etc.

As explained above, in this embodiment, the in-plant apparatus starting time shortening unit 223 acquires the information on the in-plant apparatus starting sequence from the database 23 after receiving the execution instruction of the integrated controller 225. Next, based on the power consumption of the power plant apparatus 11 and the electric discharge capacity of the storage cell that are contained in the information on the in-plant apparatus starting sequence, it calculates the parallel starting sequence in which units of the power plant apparatuses 11 are started in parallel. Then, it controls so that electric power may be supplied to the power plant apparatuses 11 from the storage cell within the range of the electric discharge capacity of the storage cell according to the parallel starting sequence.

By supplying the electric power from the storage cell at the time of starting the power plant apparatuses, it can be made possible to simultaneously start the power plant apparatuses that exceed an upper limit of starting electric power. Thereby, the starting times of the power plant and the power generation facilities can be shortened.

[Example of Operation of Constant Load Operation Support Unit]

Figure 7:
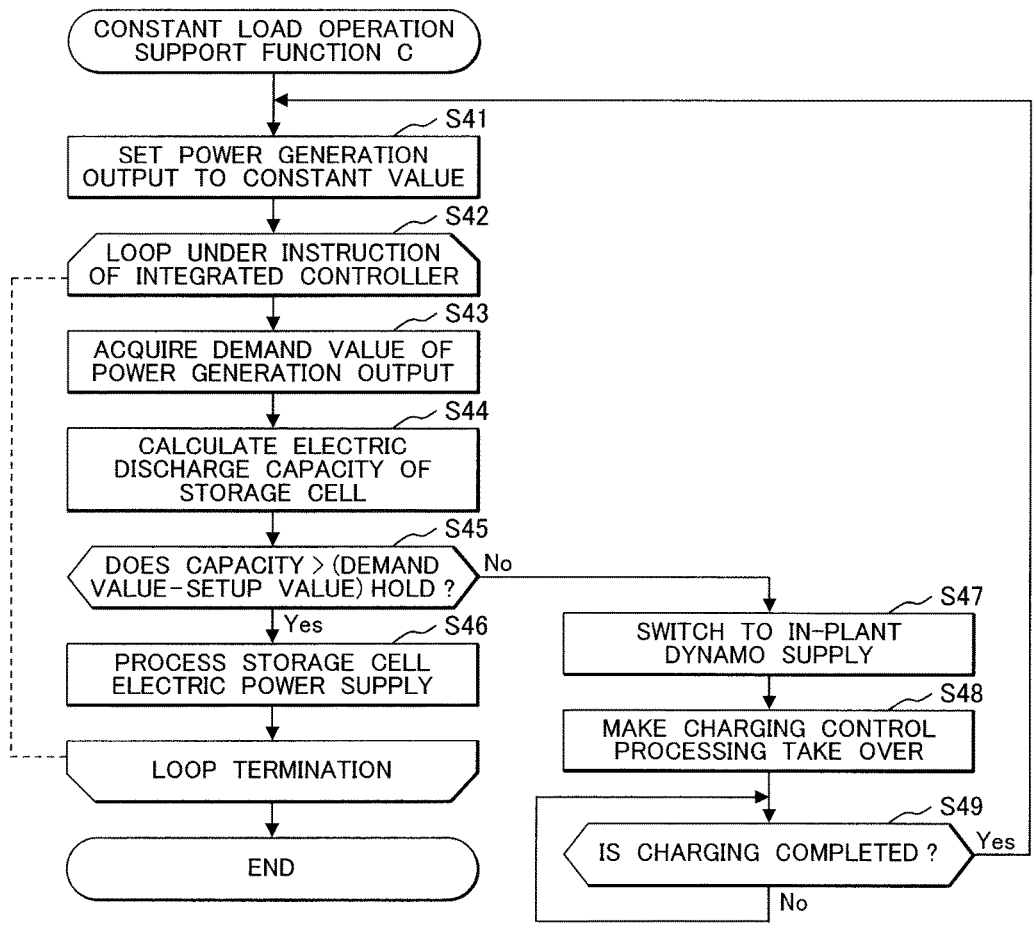
FIG. 7 is a flowchart showing an example of operation of a constant load operation support unit shown in FIG. 2.

FIG. 7 is a flowchart showing an example of an operation of the constant load operation support unit 224 shown in FIG. 2.

First, output values (setup value: supply) that should be fixed for operating the power plant apparatuses 11 at a constant load are set in advance (Step S41) so that the power plant apparatuses 11 such as the dynamo may become efficient and long-lived. This setting may be automatically set up from the operation status of the power plant 10, or may be set up manually by an operating member.

The constant load operation support unit 224 performs loop processing of Steps S43 to S46 continuously while there is an instruction from the integrated controller 225 (Step S42).

Next, the constant load operation support unit 224 acquires the demand value (demand) of a quantity of the power generation output that is obtained via the network for control 14 and the information system network (Step S43).

Next, the constant load operation support unit 224 calculates the discharge capability (electric discharge capacity) of the storage cell through the storage cell control unit 226 (Step S44).

Next, the constant load operation support unit 224 determines whether the electric discharge capability of the storage cell can cover electric power of a difference obtained by subtracting the setup value from the demand value being a demand (Step S45). In order to support the constant load operation, it is necessary to cover a difference obtained by subtracting the setup value from the demand value being the demand with the electric power supply from the storage cell.

If the electric power of the difference can be covered, the constant load operation support unit 224 will supply the electric power from the storage cell to the power plant 10 in conjunction with the storage cell control unit 226 (Step S46). When the processing of this Step S46 is ended, the loop is terminated and the process proceeds to Step S42. The supply is continued as long as the electric power of the above-mentioned difference is covered with the electric power supply from the storage cell.

On the other hand, if it is determined that the electric power of the difference cannot be covered, the constant load operation support unit 224 will suspend the supply of the electric power from the storage cell and switch to the electric power supply by output adjustment control of the dynamo (Step S47). Then, it shifts to the charging control processing, and charges the storage cell (Step S48).

Next, the constant load operation support unit 224 waits until the charging of the storage cell is completed (Step S49), and shifts to processing of Step S41 after the completion of the charging.

The constant load operation support unit 224 ends the constant load operation support processing when any instruction of the integrated controller 225 ceases to exist.

As explained above, in this embodiment, the constant load operation support unit 224 acquires the setup value of the power generation output of the power plant 10 and the demand value of the power generation output to the power plant 10 after receiving the execution instruction of the integrated controller 225. When the demand value of the power generation output exceeds the setup value, the constant load operation support unit 224 controls so that electric power corresponding to a difference between the demand value and the setup value may be supplied from the storage cell to the electric power system within the range of the electric discharge capacity of the storage cell.

Although, usually, the load of the power plant is affected by the demand of the electric power of the power plant and it is necessary to make it perform an operation whose load is varied in a short period or in a long period, constant output operation can be implemented by interpolating its changed portion with the electric power of the storage cell. Thereby, it is possible to implement improvement in the power generation efficiency and improvement in lives of facilities.

[Example of Operation of Integrated Controller (First Example)]

The integrated controller 225 compares the power consumption of the power plant apparatus 11 in operation in the case of executing each function and the electric discharge capacity of the storage cell, and selects an executable function within the range of the electric discharge capacity of the storage cell. The integrated controller 225 controls so that the selected function may be executed utilizing the electric power supplied from the storage cell. Below, concrete examples of the processing will be explained. Incidentally, in the following explanations, the explanations will be given denoting the in-plant power reducing function as a function A, the in-plant apparatus starting time shortening function as a function B, and the constant load operation support function as a function C.

Figure 8:
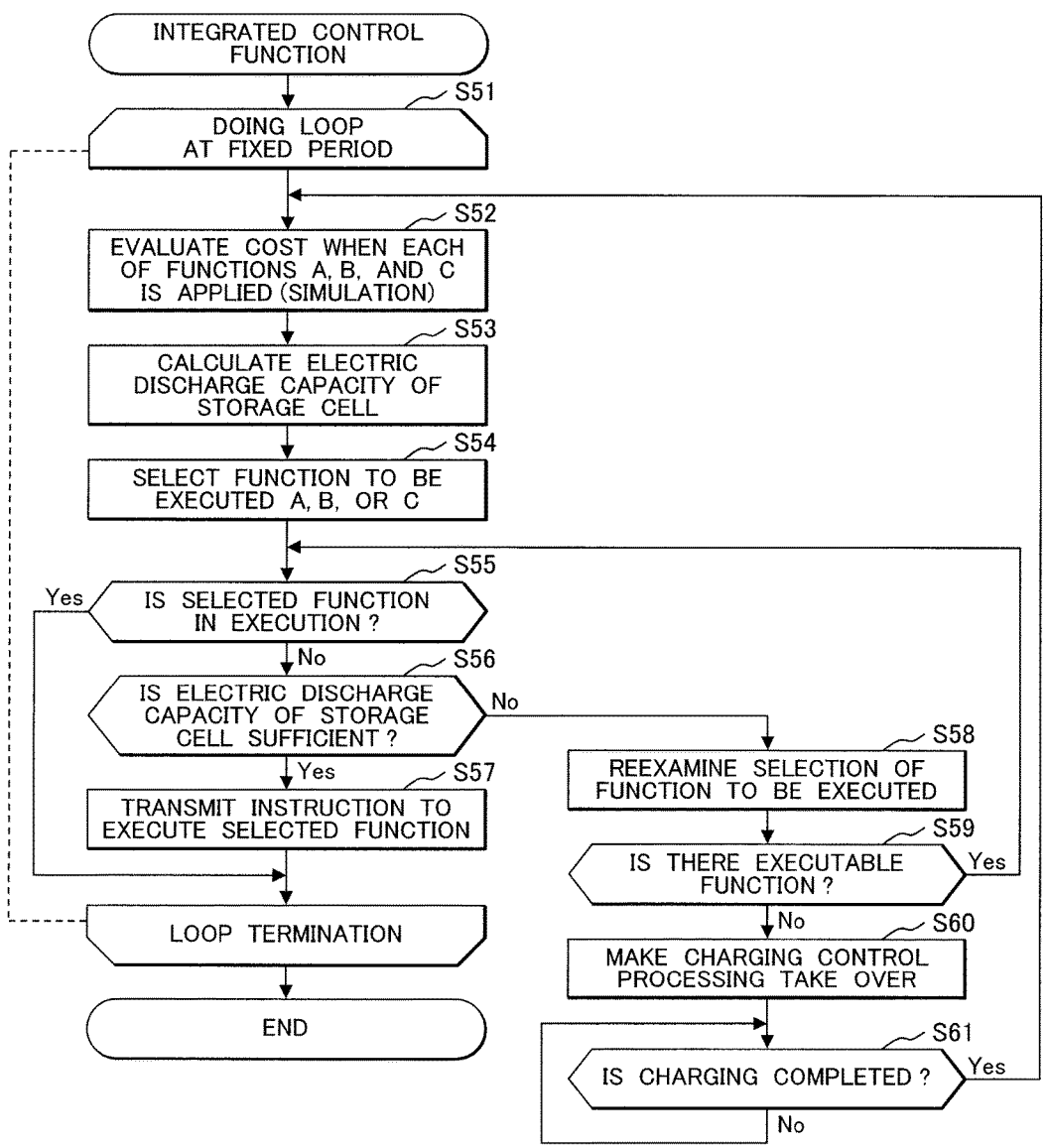
FIG. 8 is a flowchart showing an example of operation (a first example) of the integrated controller shown in FIG. 2.

FIG. 8 is a flowchart showing an example of an operation (a first example) of the integrated controller 225 shown in FIG. 2.

An integrated control function by the integrated controller 225 operates at a fixed period decided by the power plant 10 (Step S51).

First, the integrated controller 225 performs cost evaluation in the case of applying each of the functions A to C to the power plant 10 by simulation (Step S52). In this example, it acquires the operating status of the power plant apparatus 11 from the power plant 10, and obtains information on the power consumption from the database 23. Then, using information on the operating status and the power consumption of the power plant apparatus 11, a cost required in executing each function when each of the multiple functions is applied to the power plant 10 is evaluated. This simulation may be carried out by the integrated controller 225, or this may be carried out by providing a simulator separately.

Next, the integrated controller 225 calculates the discharge capability (electric discharge capacity) of the storage cell through the storage cell control unit 226 (Step S53).

Next, from the electric discharge capability of the storage cell and information on the operating status and the power consumption of the power plant apparatus 11, the integrated controller 225 determines whether it is possible for the storage cell to supply the electric power when the function is executed. Then, a function whose cost is lower among functions capable of supplying the electric power by the storage cell is selected (Step S54). If all the functions are implemented by the electric power supply from the storage cell, there will be no problem. If they are not implemented, the integrated controller 225 will output an instruction to each function so that it may be executed with a combination of functions that corresponds to the electric discharge capability of the storage cell and can reduce the cost most.

Next, the integrated controller 225 determines whether the selected function is in execution (Step S55). When the selected function is in execution, the process proceeds to loop termination. When the function is already being executed, the integrated controller 225 reexamines a combination of the functions to be executed and issues the execution instruction again.

On the other hand, when it is not in execution, the integrated controller 225 determines whether the electric discharge capacity of the storage cell is sufficient for the selected function (Step S56).

In the determination processing of Step S56, if the electric discharge capacity of the storage cell is sufficient, the integrated controller 225 will output the execution instruction to execute the selected function to a corresponding processing block (Step S57). When the processing of this Step S57 is ended, the loop is terminated and the process proceeds to Step S51.

On the other hand, if the electric discharge capacity of the storage cell is not sufficient in the determination processing of Step S56, the integrated controller 225 will reexamine selection of the function to be executed (Step S58). Then, the integrated controller 225 determines whether there is an executable function based on the electric discharge capacity of the storage cell (Step S59). Here, when there is an executable function, the process proceeds to Step S55, where it is determined whether the reselected function is in execution.

When there is no other executable function, the integrated controller 225 shifts to the charge control processing, and charges the storage cell (Step S60).

Next, the integrated controller 225 waits until the charging of the storage cell is completed (Step S61), and shifts to processing of Step S52 after the completion of the charging.

As explained above, in this embodiment, the integrated controller 225 acquires the operating statuses of the power plant apparatuses 11 from the power plant 10. Next, using information on the operating status and the power consumption of the power plant apparatus 11, it evaluates a cost required in executing each function when each of the multiple functions is applied to the power plant 10. Then, it selects a function that is executable within a range of the electric discharge capacity of the storage cell, and can reduce cost more.

With the above-mentioned configuration, it is possible to select a function of lower cost and to perform optimal operation control of the power plant.

[Example of Operation of Integrated Controller (Second Example)]

Figure 9:
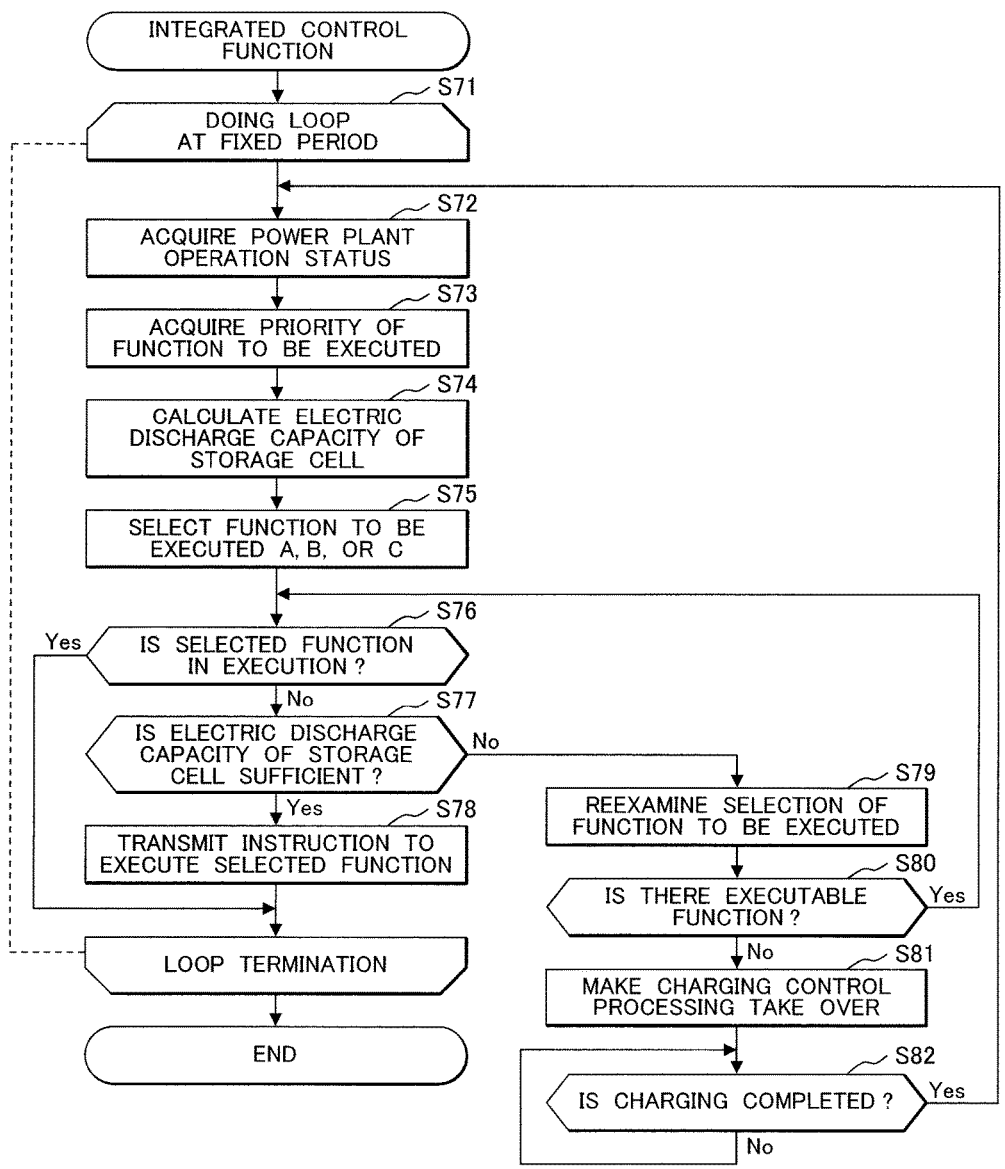
FIG. 9 is a flowchart showing an example of operation (a second example) of the integrated controller shown in FIG. 2.

FIG. 9 is a flowchart showing an example of an operation (a second example) of the integrated controller shown in FIG. 2.

The integrated control function by the integrated controller 225 operates at a fixed period decided by the power plant 10 (Step S71).

First, the integrated controller 225 acquires information on the operation status of the power plant 10 (in-plant apparatuses) via the network for control 14 (Step S72). For this, the integrated controller 225 may acquire information on the operating statuses of the power plant apparatuses 11 (in-plant apparatuses) and judges the operation status of the power plant 10 from this information.

Next, the integrated controller 225 reads the priority of the function that corresponds to the operation status of the power plant 10 designed in advance and is executed in the power plant 10 from the database 23 (Step S73). The integrated controller 225 reads the power consumption of the power plant apparatus 11 from the database 23 for each function of a priority of function to be executed. In the database 23, information on the priority of function to be executed of the power plant 10 has been registered in advance.

A definition of a table of the priority of function to be executed can be considered as the following, for example:

(1) At the time of power plant starting, function B>function A>function C;

(2) at the time of a power plant rated operation, function C>function A>function B; and (3) at the time of demand-and-supply tightness, function A>function C>function B.

Next, the integrated controller 225 calculates the discharge capability (electric discharge capacity) of the storage cell through the storage cell control unit 226 (Step S74).

Next, from the electric discharge capability of the storage cell and information on the operating status and the power consumption of the power plant apparatus 11, the integrated controller 225 determines whether it is possible for the storage cell to supply the electric power when the function is executed. Then, it selects a function whose priority is lower among the functions capable of supplying the electric power by the storage cell (Step S75). If all the functions are implemented by the electric power supply from the storage cell, there is no problem, but if they cannot be implemented, the integrated controller 225 will output instructions to respective functions so that the functions may be executed with a combination of functions of highest priorities that corresponds to the electric discharge capability of the storage cell.

Next, the integrated controller 225 determines whether the selected function is in execution (Step S76). When the selected function is being executed, the process proceeds to the loop termination. When the function is already being executed, it reexamines the combination of the functions to be executed, and issues the execution instruction again.

On the other hand, when it is not in execution, the integrated controller 225 determines whether the electric discharge capacity of the storage cell is sufficient for the selected function (Step S77).

In the determination processing of Step S77, if the electric discharge capacity of the storage cell is sufficient, the integrated controller 225 will output the execution instruction to execute the selected function to a corresponding processing block (Step S78). When the processing of this Step S78 is ended, the loop is terminated and the process proceeds to Step S71.

On the other hand, if the electric discharge capacity of the storage cell is not sufficient in the determination processing of Step S77, the integrated controller 225 will reexamine selection of the function to be executed (Step S79). Then, the integrated controller 225 determines whether there is an executable function based on the electric discharge capacity of the storage cell (Step S80). Here, when there is an executable function, the process proceeds to Step S76, where it is determined whether the function being reselected is in execution.

When there is no other executable function, the integrated controller 225 shifts to the charge control processing, and charges the storage cell (Step S81).

Next, the integrated controller 225 waits until the charging of the storage cell is completed (Step S82), and shifts to processing of Step S72 after the completion of the charging.

As explained above, in this embodiment, the integrated controller 225 acquires the information on the operation status of the power plant 10 from the power plant 10, and acquires information on the priority of function to be executed corresponding to the operation status of the power plant 10 from the database 23. Then, a function that is executable within the range of the electric discharge capacity of the storage cell and is higher in the priority of function to be executed is selected.

It is possible to perform the optimal operation control of the power plant by selecting a function that matches the operation status of the power plant 10 and has a higher priority by the above-mentioned configuration.

[Configuration Example of Hardware of Computer]

A series of processing described above can be executed by hardware, or can be executed by software. In the case where the series of processing is executed by software, programs of which the software is comprised are installed from a program recording medium into a computer that is incorporated in exclusive hardware or a personal computer capable of executing various functions by installing various programs in it, for example, a general-purpose one, or the like.

FIG. 10 is a block diagram showing a configuration example of hardware of the computer that executes a series of processing described above by a program.

In a computer 100, a CPU 101, read only memory (ROM) 102 and RAM 103 are connected with one another by a bus 104.

To the bus 104, an input/output interface 105 is further connected. To the input/output interface 105, there are connected: an input unit 106 configured of a keyboard, a mouse, a microphone, etc.; an output unit 107 configured of a display, a speaker, etc; a recording unit 108 configured of a hard disk, nonvolatile memory, etc.; a communication unit 109 configured of a network interface, etc.; and a drive 110 for driving a removable medium 111 such as a magnetic disc, an optical disc, a magneto-optical disc, or semiconductor memory.

In the computer configured as described above, a series of processing described above is performed by the CPU 101, for example, loading a program recorded in the recording unit 108 to the RAM 103 through the input/output interface 105 and the bus 104 and executing it.

The program that the computer (CPU 101) executes is provided, for example, by being recorded in the removable medium 111 that is a package medium configured of, for example, a magnetic disc (including a flexible disc), optical disc (a CD-ROM (Compact Disc Read Only Memory), a DVD (Digital Versatile Disc), etc.), a magneto-optical disc, or semiconductor memory, or the like, or through a wired or wireless transmission medium such as a local area network, the Internet, digital satellite broadcasting.

Then the program can be installed in the recording unit 108 through the input/output interface 105 by inserting the removable medium 111 in the drive. Moreover, the program can be received by the communication unit 109 through a wired or wireless transmission medium, and can be installed into the recording unit 108. In addition, the program can be installed in advance in the ROM 102 or the recording unit 108.

Incidentally, the program that the computer executes may be a program by which processing is performed in a time-series manner along a sequence explained in this description, or a program by which processing is performed in parallel or at necessary timing such as when a call is done, etc.

As described above, the present invention is not limited to each embodiment described above, and it is natural that the present invention can take other various modifications and application examples as long as they do not deviate from the gist described in the scope of claim for patent.

REFERENCE SIGNS LIST

1 . . . Plant control system,
10 . . . Power plant,
20 . . . Storage cell system,
21 . . . Storage cell facility,
22 . . . Storage cell control device,
23 . . . Database,
221 . . . Input/output unit,
222 . . . In-plant power reducing unit,
223 . . . In-plant apparatus starting shortening unit,
224 . . . Constant load operation support unit,
225 . . . Integrated controller,
226 . . . Storage cell control unit,
227 . . . Data management unit.

The invention claimed is:

1. A storage cell system, comprising:
a storage cell which charges utilizing surplus electric power generated by a power plant;
a database which accumulates at least information on power consumption of each power plant apparatus (hereinafter described as an in-plant apparatus); and
a storage cell control device including:
an integrated controller which compares the power consumption of the in-plant apparatus in operation in case of executing each function among a plurality of functions and an electric discharge capacity of the storage cell, selects an executable function within a range of the electric discharge capacity of the storage cell, and controls to execute a selected function utilizing electric power supplied from the storage cell, and
a storage cell control unit which controls charging/discharging of the storage cell in response to control of the integrated controller; wherein information on priority of a function that is executed (hereinafter described as a priority of function to be executed) in the power plant is accumulated in the database, and wherein the integrated controller acquires information on an operation status of the power plant from the power plant, acquires the information on the priority of function to be executed corresponding to the operation status of the power plant from the database, and selects a function that is executable within the range of the electric discharge capacity of the storage cell and is higher in the priority of function to be executed.

2. The storage cell system according to claim 1, wherein the integrated controller acquires operating statuses of the in-plant apparatuses from the power plant, evaluates a cost required in execution of each function when each of the functions is applied to the power plant using information on the operating statuses and the power consumption of the in-plant apparatuses, and selects a function that is executable within a range of the electric discharge capacity of the storage cell and can further reduce the cost.

3. The storage cell system according to claim 2, wherein the functions include two or more functions of:
an in-plant power reducing function of reducing electric power required to drive at least auxiliary machinery for power generation of the power plant,
an in-plant apparatus starting time shortening function of shortening starting times of the in-plant apparatuses, and
a constant load operation support function of supporting a constant load operation of the power plant.

4. The storage cell system according to claim 3, wherein the storage cell control device further comprises an in-plant power reducing unit which executes the in-plant power reducing function, and
wherein the in-plant power reducing unit acquires information on the operating statuses of the in-plant apparatuses after receiving an execution instruction of the integrated controller, sets up supply priority in the case of supplying the electric power to the in-plant apparatuses in operation from the storage cell based on the power consumption of each in-plant apparatus in operation, and controls to supply the electric power from the storage cell to the in-plant apparatus within a range of the electric charge capacity of the storage cell according to the supply priority.

5. The storage cell system according to claim 3, wherein information on in-plant apparatus starting sequence is accumulated in the database,
wherein the storage cell control device further comprises an in-plant apparatus starting time shortening unit which executes the in-plant apparatus starting time shortening function, and
wherein the in-plant apparatus starting time shortening unit acquires the information on the in-plant apparatus starting sequence from the database after receiving an execution instruction of the integrated controller, calculates a parallel starting sequence by which parts of the in-plant apparatuses are started in parallel based on the power consumption of the in-plant apparatuses contained in information on the in-plant apparatus starting sequence and the electric discharge capacity of the storage cell, and controls to supply the electric power from the storage cell to the in-plant apparatuses within the range of the electric discharge capacity of the storage cell according to the parallel starting sequence.

6. The storage cell system according to claim 3, wherein the storage cell control device further comprises a constant load operation support unit which executes a constant load operation support function, wherein the constant load operation support unit acquires a setup value of the power generation output of the power plant and a demand value of the power generation output for the power plant after receiving an execution instruction of the integrated controller, and controls to supply electric power equivalent to a difference between the demand value and the setup value to an electric power system from the storage cell when the demand value of power generation output exceeds the setup value.

7. A power plant control system, comprising:
a power plant;
a storage cell which charges electric power utilizing surplus electric power generated by the power plant:
a database which accumulates at least information on power consumption of each power plant apparatus (hereinafter described as an in-plant apparatus); and
a storage cell control device including:
an integrated controller that compares the power consumption of the in-plant apparatus in operation in a case of executing each function among a plurality of functions and an electric discharge capacity of the storage cell, selects an executable function within a range of the electric discharge capacity of the storage cell, and controls to execute the selected function utilizing electric power supplied from the storage cell, and
a storage cell control unit which controls charging/discharging of the storage cell in response to the control of the integrated controller; wherein information on priority of a function that is executed (hereinafter described as a priority of function to be executed) in the power plant is accumulated in the database, and wherein the integrated controller acquires information on an operation status of the power plant from the power plant, acquires the information on the priority of function to be executed corresponding to the operation status of the power plant from the database, and selects a function that is executable within the range of the electric discharge capacity of the storage cell and is higher in the priority of function to be executed.

* * * * *